United States Patent [19] [11] 4,439,599
Watanabe et al. [45] Mar. 27, 1984

[54] POLYURETHANE HAVING EXCELLENT ELASTIC RECOVERY AND ELASTIC FILAMENT OF THE SAME

[75] Inventors: Shoji Watanabe; Takuya Miho; Naoki Nakashima, all of Ohtake; Yoshiyuki Ikemoto, Yokohama, all of Japan

[73] Assignee: Daicel Chemical Industries, Ltd., Osaka, Japan

[21] Appl. No.: 426,453

[22] Filed: Sep. 29, 1982

[30] Foreign Application Priority Data

Oct. 2, 1981 [JP] Japan .................................. 56-157181
Aug. 6, 1982 [JP] Japan .................................. 57-137094

[51] Int. Cl.³ ............................................. C08G 18/42
[52] U.S. Cl. ......................................... 528/80; 528/906
[58] Field of Search .................................. 528/80, 906

[56] References Cited

U.S. PATENT DOCUMENTS 3,428,611 2/1969 Brotherton et al. .................. 528/80
3,775,354 11/1973 Hostettler et al. .................... 528/80

Primary Examiner—Maurice J. Welsh
Attorney, Agent, or Firm—Flynn, Thiel, Boutell & Tanis

[57] ABSTRACT

A polyurethane having excellent elastic recovery is obtained by reacting an organic diisocyanate with a polycaprolactone polyester-diol prepared from a dihydric alcohol, a dibasic acid, an ester thereof or an anhydride thereof and ε-caprolactone or/and hydroxycaproic acid and having a hydroxyl value of 35 to 150 KOH mg/g and a content of ε-caprolactone and hydroxycaproic acid of 69 to 95% by weight.

4 Claims, No Drawings

POLYURETHANE HAVING EXCELLENT ELASTIC RECOVERY AND ELASTIC FILAMENT OF THE SAME

The invention relates to polyurethane having excellent elastic recovery and elastic filament of the same and furthermore production of them.

Heretofore, linear polyurethanes have been synthesized by reacting a long-chain polyol having hydroxyl groups on both molecular terminals with an organic diisocyanate and a relatively low-molecular weight compound having two active hydrogen atoms, called a chain extender, such as a diamine or an alkanolamine. The long-chain polyol having hydroxyl groups on both molecular terminals chiefly used is a polyester-polyol or a polyether-polyol. The polyester-polyol generally used includes a polyester-polyol synthesized from adipic acid and ethylene glycol, 1,4-butylene glycol, 1,6-hexane glycol or the like or a polycaprolactone-polyol obtained from ε-caprolactone. The polyether-polyol used includes a polymer or copolymer of ethylene oxide or propylene oxide or a polytetramethylene glycol as a polymer of tetrahydrofuran. Among these, the polyether-polyol, particularly, polytetramethylene glycol is widely used in the fields of articles such as spandex, that is, elastic fiber, and urethane elastomers required to have low compression permanent set, because the glycol has excellent water resistance and also because polyurethanes made from the glycol possess excellent recovery.

However, the polyether-polyols have a defect that their weather resistance and heat resistance are extremely poor because of their susceptibility to oxidative degradation.

On the other hand, polyurethanes prepared from ethylene glycol adipate polyester as a polyester-polyol are excellent in elastic recovery but poor in water resistance and accordingly products from the polyester have a defect that they become useless within one year or two. Moreover, 1,4-butylene glycol adipate polyester has water resistance in some degree, but urethanes derived therefrom have extremely poor elastic recovery.

Furthermore, polyurethanes made from a polycaprolactone-polyol derived from ε-caprolactone have a feature that they are not only excellent in water resistance but also extremely excellent in weather resistance and heat resistance, deficiency of which is a defect of the polyether-polyols. In spite of such a feature, the polyurethanes have not been used in the field of spandex, etc., because of a defect that their elastic recovery is very poor.

As a result of eager studies to eliminate such a defect of polycaprolactone urethane, the inventors of this invention have found that polyurethanes made from polycaprolactone polyester-polyol synthesized from a polyhydric alcohol, a polybasic acid and ε-caprolactone or hydroxycaproic acid show an excellent elastic recovery not found in conventional polyurethanes and have reached this invention.

Namely, this invention provides a polyurethane prepared by using, as a compound having two active hydrogen atoms in the molecule in producing a polyurethane by reacting an organic diisocyanate with said compound, a polycaprolactone polyester-diol prepared from a dihydric alcohol, a dibasic acid, an ester thereof or an anhydride thereof and ε-caprolactone and/or hydroxycaproic acid and having a hydroxyl value of 35 to 150 KOH mg/g and a content of ε-caprolactone and hydroxycaproic acid of 60 to 95% by weight and having an elastic recovery of at least 50%, preferably at least 70% and a process for producing the same.

The OH value is measured according to Japan Industrial Standard (JIS) K-1557, 6.4.

The elastic recovery as used herein is a value calculated from the following expression. That is, a % recovery (at 25° C.) shown by a polyurethane when it is stretched 300% its original length and, after relaxation of the strain, is allowed to stand for 10 minutes.

$$\% \text{ recovery} = 1 - \frac{l' - l}{l} \times 100 \ (\%)$$

wherein
l: length between indication lines before stretch
l': length between indication lines after stretch and relaxation of strain.

The dihydric alcohols as starting materials for the above polycaprolactone polyester-polyols used in this invention include ethylene glycol, propylene glycol, 1,3-butylene glycol, 1,4-butylene glycol, 2-methyl-1,3-propanediol, 1,5-pentyl glycol, neopentyl glycol, 1,6-hexanediol, diethylene glycol, dipropylene glycol, hydroxypyruvic acid ester of neopentyl glycol, 2,3,5-trimethylpentanediol, and AOG×24 (trade name, a mixture of $C_{12}$ and $C_{14}$ α-olefin glycols produced by Daicel Ltd.). Neopentyl glycol is preferable. A combination of combination of neopentyl glycol and another diol such as ethylene glycol and 1,4-butylene glycol may be used. As the dibasic acids, an ester thereof or an anhydride thereof there can be used maleic acid, succinic acid, fumaric acid, adipic acid, sebacic acid, azelaic acid, dodecanedioic acid, phthalic acid, isophthalic acid, terephthalic acid, hexahydrophthalic acid, tetrahydrophthalic acid, methyltetrahydrophthalic acid, and anhydrides thereof. Adipic acid and sebacic acid are preferable.

As the third material, ε-caprolactone, there can be used one which is industrially manufactured by oxidizing cyclohexanone with hydrogen peroxide or a peracid such as peracetic acid according to a Bayer-Biliger reaction. Moreover, unless the feature of this invention is not adversely affected, lactones or hydroxy acids other than ε-caprolactone and hydroxycaproic acid can be used in combination with ε-caprolactone. The polycaprolactone polyester-diol synthesized from a dihydric alcohol, a dibasic acid or an ester thereof and ε-caprolactone or hydroxycaproic acid has an OH value of 35 to 150 KOH mg/g, preferably 40 to 100, more preferably 40 to 60, and a content of ε-caprolactone and hydrocaproic acid of 60 to 95% by weight, preferably 65 to 90% by weight. The polycaprolactone polyester-diols can be synthesized by heating, with stirring, a dihydric alcohol, a dibasic acid and ε-caprolactone or hydroxycaproic acid and effecting a dehydration/esterification reaction and a ring-opening reaction or an ester inter-change reaction. It is also possible to obtain the desired product by mixing a polyester-diol synthesized by a dehydration/esterification reaction between a dihydric alcohol and a dibasic acid with a polycaprolactone-diol synthesized by a ring-opening reaction of ε-caprolactone and effecting an ester interchange reaction between them. Moreover, it can also be synthesized by subjecting 4-caprolactone and a low-molecular weight polyester-diol to a ring opening polymerization.

These reactions are carried out at 130° to 240° C., preferably 140° to 230° C. Temperatures higher than 250° C. not only adversely affects the color of the resulting resin but also cause depolymerization of the polycaprolactone. Accordingly, it is impossible to obtain the desired product.

In this reaction, 0.05 to 1,000 ppm, preferably 0.1 to 100 ppm of a catalyst is used. As the catalysts there can be used organotitanium compounds such as tetrabutyl titanate, tetrapropyl titanate and tin compounds such as dibutyltin laurate, tin octoate, dibutyltin oxide, stannous chloride, stannous bromide and stannous iodide. To prevent coloration of the resin it is preferable that the reaction is carried out under a stream of an inert gas such as nitrogen.

As the organic diisocyanates used in the production of the polyurethane of this invention there can be mentioned 2,4-tolylene diisocyanate, 2,6-tolylene diisocyanate, 4,4'-diphenylmethane diisocyanate, tolylene diisocyanate, hexamethylene diisocyanate, xylylene diisocyanate, hydrogenated 4,4'-diphenylmethane diisocyanate, isophorone diisocyanate and 1,5-naphthylene diisocyanate. As the low-molecular weight compounds having active hydrogen atoms of this invention, called a chain extender, there can be used ethylene glycol, propylene glycol, 1,4-butylene glycol, 2-methyl-1,3-propanediol, neopentyl glycol, pentanediol, 1,6-hexanediol, ethylenediamine, propylenediamine, hydrazine, isophoronediamine m-phenylenediamine, 4,4'-diaminodiphenylmethane, diaminodiphenyl sulfone and 3,3'-dichloro-4,4'-diaminodiphenylmethane.

As the production process of the polyurethane of this invention there can be used any of the following processes: a prepolymer process in which a diol and an excess of an organic diisocyanate are reacted to produce a prepolymer having isocyanato groups on both terminals and, then the prepolymer is reacted with a chain extender such as a diol or a diamine to produce a polyurethane or a one-shot process in which all of the components are added at once to form a polyurethane. These polyurethane production processes can be carried out in the presence or absence of a solvent. As the solvents there are employed those inert to an isocyanate. For example, there are used toluene, xylene, ethyl acetate, butyl acetate, methyl ethyl ketone, dimethylformamide and tetrahydrofuran.

The polycaprolactone polyester-diol type urethane of this invention is excellent not only in water resistance, weather resistance and heat resistance but also excellent in elastic recovery as compared with conventional polyurethanes. The reason for this can be interpreted as follows: because the dibasic chain and the dihydric chain constituting polyester chains are randomly, partially interposed in between the molecular chains of the polycaprolactone-diol, the crystallinity of the polycaprolactone is somewhat disturbed and this strengthens further the structure of crystalline crosslinking sites which are repeating portions consisting of the chain extender of the polyurethane and the diisocyanate.

The polyurethane of this invention can be used extremely advantageously in spandex, thermoplastic urethane elastomers, thermosetting urethane elastomers, rigid and flexible urethane foams, adhesives, artificial leathers, synthetic leathers, paints, or the like.

In particular, the polyurethane elastic filament according to the invention will be illustrated below.

The structure of the polycaprolactone polyester diol of the present invention obtained by these synthesis reactions is different from that of a perfect block copolymer consisting of polycaprolactone and polyester chains prepared by the ring-opening polymerization of caprolactone with terminal hydroxyl group(s) of a polyester diol obtained from a dihydric alochol and a dibasic acid. Rather, this polymer has a random copolymer structure wherein residues of the dihydric alcohol and dibasic acid are distributed at random in a polycaprolactone chain by the interesterification reaction. This fact is proved by the fact that if a block copolymer obtained by the ring-opening polymerization of a polyester diol comprising a dihydric alcohol and a dibasic acid with ε-caprolactone is further heated, its melting point and melt viscosity are gradually reduced to attain definite values. Namely, the block copolymer is converted into the random copolymer by the interesterification reaction to reduce its crystallizability.

Furthermore, stabilizers for the polyurethane elastic filament, such as conventional antioxidant, U.V. absorber, mildew-proofing agent, heat deterioration inhibitor and hydrolysis inhibitor, as well as a filler such as titanium oxide and a pigment may be added.

Particularly, the addition of a hydrolysis inhibitor such as a carbodiimide compound, e.g. Stabaxol I or P (trade names of Farbenfabriken Bayer AG), is effective.

The polyurethane elastic filament according to the invention may be produced by conventional spinning methods, such as the wet method, the dry method and the melting method. The filament can be made into a fabric by itself or in combination with other fibers. Female garments such as stockings, brassieres, shorts and foundations and industrial elastic fabrics can be made from the filament according to the invention.

This invention will now be illustrated with reference to examples and a comparative example, though it should be noted that this invention is not limited by these examples. In these examples parts are given by weight.

SYNTHESIS EXAMPLE 1

Into a four-necked flask fitted with a nitrogen inlet tube, a thermometer, a condenser for removing water of esterification and an agitating means were charged 3,450 parts of adipic acid, 3,466 parts of neopentyl glycol and 0.053 part of tetrabutyl titanate, and the mixture was esterified by dehydration at 140° to 220° C. for 27 hours to obtain a polyester-diol having an acid value of 0.54 KOH mg/g and a hydroxyl value of 159.4 KOH mg/g (hereinafter, the unit is not explicitly shown).

To 3,364 parts of this polyester-diol were added 6,236 parts of ε-caprolactone and 0.063 parts of tetrabutyl titanate, and the mixture was heated, with stirring, at 190° C. for 15 hours to effect a ring-opening reaction and ester interchange reaction of the lactone. A polycaprolactone polyester-polyol having a hydroxyl value of 55.4, an acid value of 0.3 and a m.p. of 4° to 5° was obtained. A lactone content was 65 wt.%.

SYNTHESIS EXAMPLE 2

A mixture of 2,369 parts of the polyester-diol, prepared from adipic acid and neopentyl glycol in SYNTHESIS EXAMPLE 1, 116.2 parts of ethylene glycol, 7,918 parts of ε-caprolactone, and 0.08 part of tetrabutyl titanate was heated, with stirring, at 220° C. for 8 hours to obtain a polycaprolactone polyester-diol having a hydroxyl value of 56.3, an acid value of 0.6 and a m.p. of 14° to 15° C. A lactone content was 76.1 wt.%.

SYNTHESIS EXAMPLE 3

A mixture of 695 parts of the polyester-polyol, obtained from adipic acid and neopentyl glycol in SYNTHESIS EXAMPLE 1, 103 parts of ethylene glycol, 4,503 parts of ε-caprolactone and 0.053 part of tetrabutyl titanate was heated, with stirring, at 200° C. for 12 hours to obtain a polycaprolactone polyesterpolyol having a hydroxyl value of 55.2, an acid value of 0.34 and a m.p. of 38° to 41° C. A lactone content was 85 wt.%.

SYNTHESIS EXAMPLE 4

To 280.0 parts of commercially available 1,4-butylene glycol adipate (trade name Nippolan N-4010, MW 2,000) were added 65.1 parts of ethylene glycol, 1,938.0 parts of ε-caprolactone and 0.024 part of tetrabutyl titanate, and the mixture was reacted at 220° C. for 8 hours to obtain a polycaprolactone polyester-diol produced by the ester interchange reaction between polycaprolactone and 1,4-butylene adipate. The hydroxyl value was 54.5 and the acid value was 0.07. A lactone content was 85 wt.%.

COMPARATIVE SYNTHESIS EXAMPLE 1

Into an apparatus similar to that used in SYNTHESIS EXAMPLE 1 were charged 632 parts of ethylene glycol, 19,380 parts of ε-caprolactone and 0.2 part of tetrabutyl titanate, and the mixture was reacted at 170° C. for 5 hours to obtain a polycaprolactonediol having a hydroxyl value of 56.2 and an acid value of 0.25.

EXAMPLES 1, 2, 3 and 4 and COMPARATIVE EXAMPLE 1

Each of the polyols obtained in SYNTHESIS EXAMPLES 1, 2, 3 and 4 and COMPARATIVE SYNTHESIS EXAMPLE 1 was reacted with 4,4′-diphenylmethane diisocyanate (MDI) and 1,4-butylene glycol as a chain extender to obtain a polyurethane resin. The results are shown in TABLE 1. The mixing was carried out under conditions: NCO/OH=1.05 and chain extender/polyol=2.0.

TABLE 1

|  | EX. 1 | EX. 2 | EX. 3 | EX. 4 | COMP. EX. 1 |
|---|---|---|---|---|---|
| Polycaprolactone Polyesterdiol | SYN. | SYN. | SYN. | SYN. | COMP. |

TABLE 1-continued

|  | EX. 1 | EX. 2 | EX. 3 | EX. 4 | SYN. EX. 1 |
|---|---|---|---|---|---|
| Properties of polyurethane |  |  |  |  |  |
| 100% modulus (kg/cm²) | 47 | 49 | 47 | 48 | 52 |
| 300% modulus (kg/cm²) | 96 | 102 | 92 | 83 | 107 |
| tensile strength (kg/cm²) | 269 | 311 | 321 | 349 | 390 |
| elongation (%) | 560 | 540 | 550 | 563 | 550 |
| hardness (JIS A) | 80 | 82 | 82 | 82 | 84 |
| elastic recovery (%) | 75 | 80 | 80 | 90 | 20 |

COMPARATIVE SYNTHESIS EXAMPLE 2

750 parts of ethylene glycol, 1537 parts of adipic acid and 0.023 part of tetrabutyl titanate were charged in the same device as in SYNTHESIS EXAMPLE 1. The dehydration esterification reaction was carried out at 170° C. for 30 h to obtain a polyester diol having an acid value of 0.70 and hydroxyl value of 53.4.

EXAMPLES 5, 6, 7 and COMPARATIVE EXAMPLES 2, 3

The polycaprolactone polyester diols obtained in SYNTHESIS EXAMPLES 1, 3 and 4, polycaprolactone diol obtained in COMPARATIVE SYNTHESIS EXAMPLE 1 and polyethylene adipate diol obtained in COMPARATIVE SYNTHESIS EXAMPLE 2 were subjected to the urethanization reaction with 4,4′-diphenylmethane diisocyanate (MDI) in the presence of 1,4-butylene glycol (a chain extender) at 135° C. to obtain polyurethane elastomers. The amounts of the starting materials were controlled so as to obtain an isocyanate group/hydroxyl group ratio of 1.05 (equivalent ratio) and chain extender/long-chain diol ratio of 1.19 (molar ratio). The thus obtained polyurethane elastomers were melt-spun by means of an extruder. The spinning temperature was controlled in the range of 180°–220° C. so as to attain an extension of the filament of 400%. Further, the ratio of the extrusion speed to the haul-off speed was controlled to obtain 14,000 denier urethane elastic filament drawn 5-fold as long. The physical properties, heat resistances and alkali resistances of these elastic filaments were measured to obtain the results shown in TABLES 2 and 3.

TABLE 2

|  |  | Item |  |  |  |  |  |
|---|---|---|---|---|---|---|---|
|  |  | Note (F) Breaking extension (%) | Note (F) Extension stress (g/× 10⁴d) | | Note (A) Stress-retention rate at 100% extension (%) | Note (B) Long-term strain at 200% extension at 20° C. (%) | | Note (C) Repeated extension strain (%) (20 times extension to the maximum extension) |
|  | Polyol |  | 100% | 200% |  | 24-10′ | 24-24 |  |
| Comp. Ex. 2 | Comp. Synthesis Ex. 1 | 400 | 200 | 330 | 61 | 25 | 14 | 50 |
| Ex. 5 | Synthesis Ex. 1 | 410 | 240 | 330 | 73 | 12 | 7 | 25 |
| Ex. 6 | Synthesis Ex. 3 | 400 | 240 | 350 | 69 | 6 | 4 | 17 |
| Ex. 7 | Synthesis Ex. 4 | 410 | 230 | 340 | 68 | 11 | 6 | 26 |
| Comp. Ex. 3 | Comp. Synthesis Ex. 2 | 400 | 225 | 320 | 62 | 10 | 6 | 41 |

TABLE 3

| | Polyol | Heat resistance | | Alkali resistance (Note G) | |
|---|---|---|---|---|---|
| | | Note (D) Creep (°C.) | Note (E) Cut-through temp. (°C.) | 200% stress retention rate (%) | Weight retention rate (%) |
| Comp. Ex. 2 | Comp. Synthesis Ex. 1 | 145 | 150 | 45 | 70 |
| Ex. 5 | Synthesis Ex. 1 | 147 | 152 | 44 | 71 |
| Ex. 6 | Synthesis Ex. 3 | | 155 | 45 | 74 |
| Ex. 7 | Synthesis Ex. 4 | 149 | 156 | 45 | 73 |
| Comp. Ex. 3 | Comp. Synthesis Ex. 2 | 130 | 148 | 0 | 0 |

The test methods employed in the present invention were as follows:

Note (A) Stress-retention rate at 100% extension:
 Test pieces were kept at 100% extension for 10 min and the stress-retention rates were measured. The rate was represented by the following formula:

Stress-retention rate at 100% extension =

$$\frac{\text{Stress after the 100\% extension for 10 min}}{\text{Stress immediately after the 100\% extension}} \times 100 \ (\%)$$

Note (B) Long-term strain at 200% extension at 20° C.:
 Test pieces were kept at 200% extension at 20° C. for 24 h and then released from the tension. Strains of the test samples were measured after a given period of time "24-10'" refers to strain 10 min after the release from the tension and "24—24" refers to one 2.4 h after the release. The strain was represented by the following formula:

Long-term strain at 200% extension at 20° C. =

$$\frac{l' - l}{l} \times 100 \ (\%)$$

wherein represents a distance between two gage marks before the extension, and l' represents the distance a given time after the release from the tension.

Note (C) Repeated extension strain:
 After 20-time repeated extension to the maximum extension, the test samples were released from the tension and the strain was measured after 10 min and represented by the following formula:

$$\text{Repeated extension strain} = \frac{l'' - l}{l} \times 100 \ (\%)$$

wherein 1 represents a distance between two gage marks before the extension and 1" represents the distance 10 min after the release from the tension.

Note (D) Creep:
 A load was applied to samples so as to realize a stress of 1 g/1000 d. The temperature was elevated gradually and a temperature at which the ductility was increased gy 40% was determined.

Note (E) Cut-through temperature:
 A load was applied to test pieces so as to realize a stress of 1 g/1000 d. The temperature was elevated at an unlimited rate and a temperature at which the test pieces were cut was determined.

Note (F) Breaking extension and extension stress:
 They were determined according to JIS K 6301-1.

Note (G) Alkali resistance:
 The samples were boiled in a 10% aqueous sodium hydroxide solution for 3 h and then extended to 200% and stress-retention rate at 100% extension was determined in the same manner as in Note (A).

It is apparent from TABLES 2 and 3 that the polyurethane elastic filaments of the present invention have excellent elasticity recovery, heat resistance and alkali resistance.

The embodiments of the invention of which an exclusive property or privilege is claimed are defined as follows:

1. A polyurethane having excellent elastic recovery, said polyurethane having been prepared by reacting an organic diisocyanate with a polycaprolactone polyester-diol, said polycaprolactone polyester-diol having been prepared by reacting a reaction mixture consisting essentially of (i) neopentyl glycol, (ii) a dibasic acid, an ester thereof or an anhydride thereof, and (iii) a material selected from the group consisting of epsilon-caprolactone, hydroxycaproic acid and mixture thereof, under conditions effective to form a random copolymer in which units derived from said neopentyl glycol and said component (ii) are randomly distributed in a polycaprolactone chain, said polycaprolactone polyester-diol having a hydroxyl value of 35 to 150 KOH mg/g and containing from 60 to 95% by weight of said material (iii).

2. A polyurethane as claimed in claim 1, in which said dibasic acid is adipic acid or sebacic acid.

3. A polyurethane as claimed in claim 1, in which said polycaprolactone polyester-diol has a hydroxyl value of 40 to 60 KOH mg/g and contains from 65 to 90% by weight of said material (iii).

4. A spandex fiber made by spinning a polyurethane as claimed in claim 1.

* * * * *